(12) United States Patent
Kuroda (10) Patent No.: US 6,991,015 B2
(45) Date of Patent: Jan. 31, 2006

(54) PNEUMATIC TIRE HAVING NON-SYMMETRIC PATTERN

(75) Inventor: Yutaka Kuroda, Kobe (JP)

(73) Assignee: Sumitomo Rubber Industries, Ltd., Hyogo-Ken (JP)

(*) Notice: Subject to any disclaimer, the term of this patent is extended or adjusted under 35 U.S.C. 154(b) by 228 days.

(21) Appl. No.: 10/305,149

(22) Filed: Nov. 27, 2002

(65) Prior Publication Data

US 2003/0116246 A1   Jun. 26, 2003

(30) Foreign Application Priority Data

Nov. 27, 2001  (JP) .............................. 2001-361317

(51) Int. Cl.
*B60C 11/03* (2006.01)
*B60C 13/02* (2006.01)
*B60C 111/00* (2006.01)

(52) U.S. Cl. .............................. 152/209.8; 152/209.16; 152/523

(58) Field of Classification Search ............. 152/209.8, 152/209.9, 209.16, 523
See application file for complete search history.

(56) References Cited

U.S. PATENT DOCUMENTS 3,253,635 A * 5/1966 Travers ....................... 152/523
4,152,186 A * 5/1979 Shibata ................... 152/209.16
5,769,976 A * 6/1998 Omokawa et al. ...... 152/209.18
6,341,636 B1 * 1/2002 Fujishiro ..................... 152/523

FOREIGN PATENT DOCUMENTS

| EP | 0 085 788 A2 | | 8/1983 |
|---|---|---|---|
| EP | 0 718 124 A1 | | 6/1996 |
| GB | 2 349 367 A | | 11/2000 |
| JP | 61-81207 | * | 4/1986 |
| JP | 61081207 | | 4/1986 |
| JP | 5-294115 | * | 11/1993 |
| JP | 11-198608 | * | 7/1999 |
| JP | 2000-16032 | * | 1/2000 |

* cited by examiner

*Primary Examiner*—Steven D. Maki
(74) *Attorney, Agent, or Firm*—Birch, Stewart, Kolasch & Birch, LLP (57) ABSTRACT

A pneumatic tire having a non-symmetric pattern in which a land ratio Lo of an outer tread surface portion To facing towards the outside of a vehicle from a tire equator C is set to be larger than a Land ratio Li of an inner tread surface pattern Ti facing towards the inside of the vehicle from the tire equator C; and concave grooves 9 extending substantially in a circumferential direction of the tire, formed in an outer tire side region Yo that is located between a grounding end Eo of the outer tread surface portion To and the maximum width position M of the tire facing towards the outside of the vehicle.

5 Claims, 5 Drawing Sheets

PNEUMATIC TIRE HAVING NON-SYMMETRIC PATTERN

BACKGROUND OF THE INVENTION

The present invention relates to a pneumatic tire capable of improving stability of steering while also improving riding comfort when performing turning movements.

FIELD OF THE INVENTION

Developments in pneumatic tires that are employed in these recent years as progressing, wherein such tires employ a non-symmetrical pattern as their tread pattern in which the land ratio of an outer tread surface portion that faces outward of an inner side of a vehicle from the tire equator is larger than the land ratio of an inner tread surface portion that faces inward of an inner side of the vehicle from the tire equator.

Stability of steering and riding comfort when performing straight-ahead running are being balanced in tires having non-symmetrical tread patterns by improving the rigidity on the outer tread surface portion while reducing the rigidity of the inner tread surface portion.

However, starting from the outer tread surface pattern, the spring coefficient of a tire side region outside of the vehicle ranging from a grounding end of the outer tread surface portion proximate to a maximum width position of the tire will become larger than the spring coefficient of a tire side region inside of the vehicle in such a tire. A problem was consequently presented that the riding comfort when performing turning movements was inferior, e.g., having some sense of roughness when the vehicle performed turning movements when compared to tires having a symmetrical pattern.

The present invention is thus aimed at providing a pneumatic tire of improved riding comfort at the time of performing turning movements while making the most of its superior steering stability that is provided by the use of non-symmetrical patterns by providing concave grooves within a tire side region facing outward of the vehicle extending substantially in a circumferential direction of the tire.

SUMMARY OF THE INVENTION

According to the present invention, the tire is arranged in that it has a tread surface having an inner tread surface portion that faces inward of an inner side of a vehicle from a tire equator and of an outer tread surface portion that faces outward of an outer side of the vehicle from the tire equator, and the tire tread has a non-symmetrical pattern in which the land ratio of the tread pattern of the outer tread surface portion is larger than a land ratio of a tread pattern of the inner tread surface portion, wherein the concave grooves extending substantially in a in the circumferential direction of the tire are formed on an outer tire side region formed between a grounding end of the outer tread surface portion and a maximum width position of the tire facing outward of the vehicle.

It is preferable that the difference Lo−Li between the land ratio Lo (%) of the outer tread surface portion and the land ratio Li (%) of the inner tread surface portion is not less than 15%, and that no circumferential grooves successively extending in a circumferential direction of the tire are formed on a tread shoulder region, which is a region occupying 25% of a treat grounding width from the grounding end of the outer tread surface portion.

It is preferable that the concave grooves are at least three in number, arranged in a concentric manner, and wherein each of the concave grooves has a groove width of 2.0 to 4.0 mm and a groove depth of 1.0 to 2.0 mm.

It is preferable that the plurality of concave grooves is arranged in such that groove capacities become larger the more the concave groove is positioned inside of a radial direction of the tire.

It is preferable that the concave grooves are formed on the outer tire side region within a region that is located further inside from the grounding end in the radial direction of the tire than 10% of a length Ha in the radial direction of the tire between the grounding end and the maximum width position of the tire and further outside in the radial direction of the tire than 50% thereof.

It should be noted that the term "tread grounding width TW" denotes a distance between outer ends in an axial direction of the tire of a grounding surface at which the tread surface grounds the surface when rim-assembled to a normal rim and normal load is applied to a tire of normal internal pressure condition in which it is filled with normal inner pressure. It should further be noted that outer ends of the grounding surface are referred to as grounding ends.

The term "normal rim" denotes a rim with standards being defined for each tire within standardizing systems including standards on which the tires are based, such concretely being an ordinary rim according to JATMA, a "Design rim" according to TRA and a "Measuring rim" according to ETRTO. The term "normal internal pressure" is an air pressure that is defined by the standards for each tire, such concretely being a maximum air pressure according to JATMA, a maximum value as listed in the table "TIRE LOAD LIMITS AT VARIOUS COLD INFLATION PRESSURES" according to TRA and "INFLATION PRESSURE" according to ETRTO, wherein it is defined to be 180 kPa for tires for use in a passenger car. The term "normal load" denotes a load that is defined by the standards for each tire, such concretely being a maximum load capacity according to JATMA, a maximum value as listed in the table "TIRE LOAD LIMITS AT VARIOUS COLD INFLATION PRESSURES" according to TRA and "LOAD CAPACITY" according to ETRTO, wherein the load is defined to correspond to 80% of the above load for tires for use in a passenger car.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DESCRIPTION OF THE PREFERRED EMBODIMENTS

Figure 1:
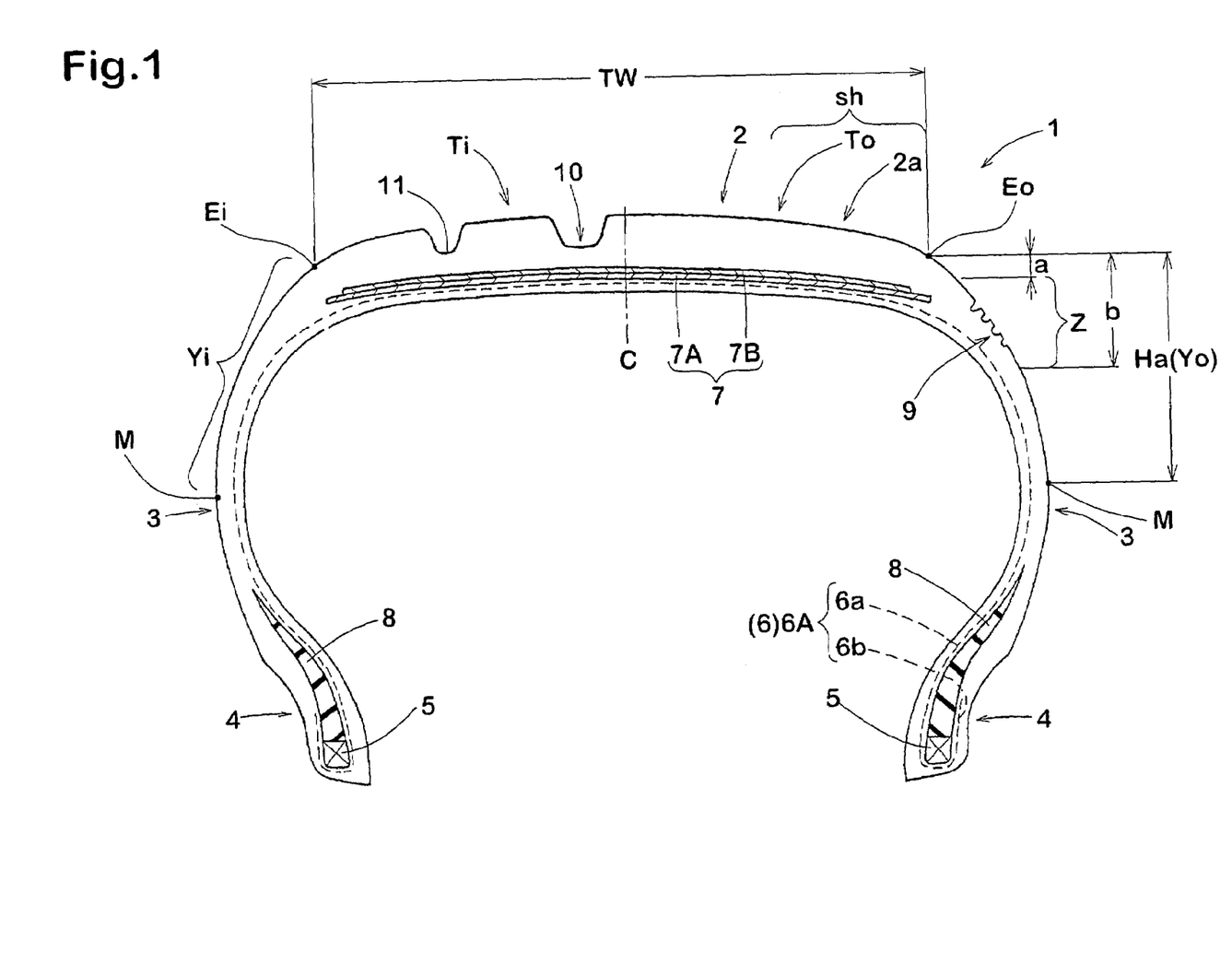
FIG. 1 is a sectional view illustrating one embodiment of the pneumatic tire according to the present invention.

Embodiments of the present invention will now be explained with reference to the drawings, wherein FIG. 1 is a meridian sectional view illustrating a case in which the pneumatic tire of the present invention is a radial tire for use in a passenger car.

In FIG. 1, pneumatic tire 1 includes carcasses 6 extending from a tread portion 2 over side wall portions 3 to bead cores 5 of the bead portions 4 and a belt layer 7 that is disposed outside of the carcasses 6 in a radial direction of the tire and within the tread portion 2.

Each carcass 6 contains at least one carcass ply 6A (wherein one is provided in the present example) of radial structure in which carcass cords are disposed at angles of, for instance, 75° to 90° with respect to tire equator C. While polyester cords are employed in the present example as the carcass cords, it is alternatively possible to employ organic fiber cords such as nylon, rayon or aromatic polyamides or, if necessary, steel cords.

The carcass ply 6A further of includes a main body portion 6a bridging over the bead cores 5,5 and a folded portion 6b that continues from the main body portion 6a and is folded back from inside to outside in the axial direction of the tire around the bead core 5. A bead apex 8 formed of hard rubber extending in a tapered manner from the bead core 5 to a location outside in the radial direction of the tire, is disposed between the main body portion 6a and the folded portion 6b for the purpose of reinforcing the bead portion 4.

The belt layer 7 contains at least two belt plies 7A, 7B (wherein two are provided in the present example) in which belt cords are disposed, including them in small angles of, for instance, 10 to 45° with respect to the tire equator C. The belt layer 7 serves to improve the rigidity of the belt and firmly reinforces the tread portion 2 through its arrangement in which the belt cords mutually intersect between the plies. While steel cords are employed in the present example as the belt cords, it is alternatively possible to employ organic fiber cords of high elasticity such as those of aromatic polyamides, in required cases.

Figure 2:
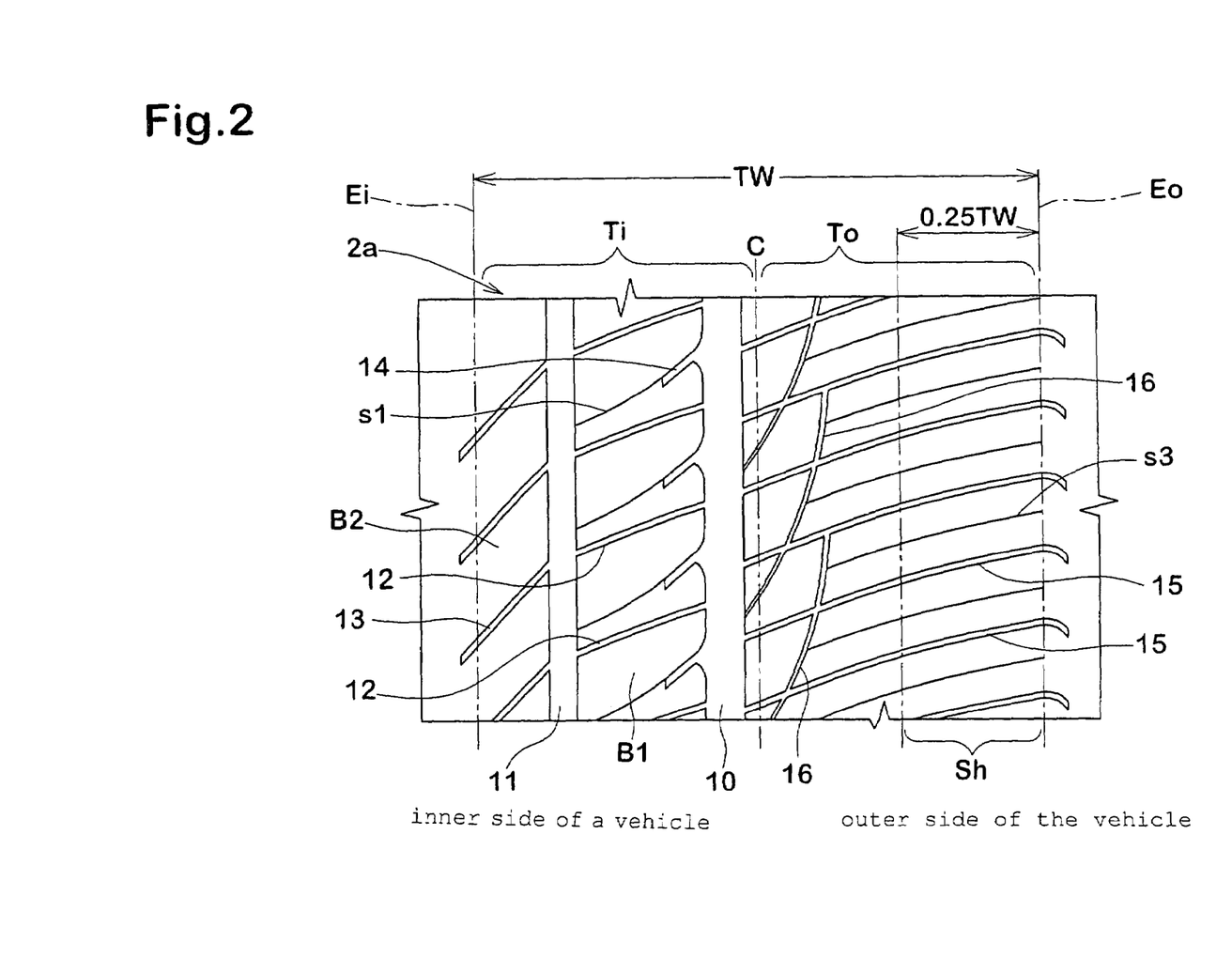
FIG. 2 is an exploded view of a tread surface illustrating tread patterns.

FIG. 2 illustrates the tread surface 2a of the pneumatic tire 1 in exploded view. Directions for attaching the pneumatic tires 1 to a vehicle are defined, and the tread surface 2a is formed of an inner tread surface portion Ti that faces inward of the vehicle from the tire equator C and an outer tread surface portion To that faces outward of the vehicle from the tire equator C. The tread pattern of the outer thread surface portion To and the tread pattern of the inner tread surface portion Ti are not symmetrical with respect to each other.

More particularly, the present example is arranged in that the inner tread surface portion Ti is provided with a first circumferential groove 10 extending in successive from in the circumferential direction of the tire proximate to the tire equator C and a second circumferential groove 11 extending in successive form in the circumferential direction of the tire intermediate of the inner grounding and Ei, which is the grouding end of the inner tread surface portion Ti, and the first circumferential groove 10.

In the present example, the first circumferential groove 10 is formed to have a relatively broad width, and the groove width thereof is set to be approximately 5 to 12% of the tread grounding width TW, and more preferably 7 to 10%. By providing such a first circumferential groove 10 of broad width in a region of high grounding pressure proximate to the tire equator C, it is possible to effectively drain water with a small number of grooves and to improve wet performances. The second circumferential groove 11 is formed to be of narrower width than the first circumferential groove 10 in the present example, wherein its groove width is defined to be approximately 2 to 6% of the tread grounding width TW, and more preferably 3 to 5%. With this arrangement, occurrence of unbalanced wear proximate to the inner grounding end E1 can be restricted.

The inner tread surface portion Ti is formed with first inclined vertical grooves 12 for connection between the first circumferential groove 10 and the second circumferential groove 11 and with second inclined vertical grooves 13 for connection between the second circumferential groove 11 and the inner grounding end Ei. With this arrangement, the inner tread surface portion Ti is partitioned into relatively small-sized blocks B1, B2. It is further possible to provide sipings S1, S2 or rugged thin grooves 14 on the inner tread surface portion Ti for optimization of rigidity of the blocks B1, B2.

The outer tread surface portion To of the present example is provided with third inclined vertical grooves 15 and fourth inclined vertical grooves 16. The third inclined vertical grooves 15 communicate at their inner ends in the axial direction of the tire with the first circumferential grooves 10 whereas their outer ends terminate while extending beyond the outer grounding end Eo outward in the axial direction of the tire. Each of the fourth inclined vertical grooves 16 communicates at one end thereof with the first circumferential groove 10 while the other end thereof communicates with one of the third inclined vertical grooves 15. It should be noted that the present example has been illustrated in which the inclined vertical grooves 12 to 16 are inclined in identical directions (up to the right in FIG. 2).

While the outer tread surface portion To may also be formed with suitable sipings s3 or the like, no circumferential grooves are formed that successively extend in the circumferential direction of the tire. Due to this arrangement of not providing the outer tread surface portion To with circumferential grooves that successively extend in the circumferential direction of the tire, the bending rigidity thereof may be effectively improved. It should be noted that when providing a circumferential groove on the outer tread surface portion To, the groove should be formed in a central region other than a tread shoulder region sh ranging from the outer grounding end Eo to 25% of the tread grounding width TW. Since the tread shoulder region sh on the outer side of the vehicle receives large shear stress from the road surface at the time of performing turning movements, it is not desirable to provide circumferential grooves on the tread shoulder region sh in view of stability of steering.

The land ratio Lo of the outer tread surface portion To is formed to be larger than the land ratio Li of the inner thread surface portion Ti in the pneumatic tire 1. It is preferable that the difference (Lo−Li) between the land ratio Lo (%) of the outer thread surface portion To and the land ratio Li of the inner tread surface portion Ti is not less than 15%, and more preferably 15 to 20%.

In such a pneumatic tire 1, it is possible to increase the rigidity of the outer tread surface portion To that is located outside when performing turning movements and further to increase the grounding area of the outer tread surface portion To when performing turning movements. It is consequently possible to generate a large cornering force and to improve stability of steering. A reduction of riding comfort when performing straight-ahead running can be prevented by relatively reducing the rigidity of the inner tread surface portion Ti. In order to improve stability of steering and riding comfort at the time of straight-ahead running in a balanced manner, it is desirable to set the land ratio Lo of the outer tread surface portion To to, for instance, approximately 60 to 85%, and more preferably 70 to 75%. It is further desirable to set the land ratio Li of the inner tread surface portion to approximately 45 to 75%, and more preferably 50 to 60%.

It should be noted that the land ratio Lo of the outer tread surface portion To is obtained, as conventionally known, as a ratio of a surface area Sao of the outer tread surface portion To (supposed that all grooves have been filled out) to a sum of areas Sbo of the outer tread surface portion To that may ground with the road surface in an actual tire (Sbo/Sao). Similarly, the land ratio Li of the inner tread surface portion Ti is obtained as a ratio of a surface area Sai of the inner tread surface portion Ti (supposed that all grooves have been filled out) to a sum of areas Sbi of the inner tread surface portion Ti that may ground with the road surface in an actual tire (Sbi/Sai).

Figure 3:
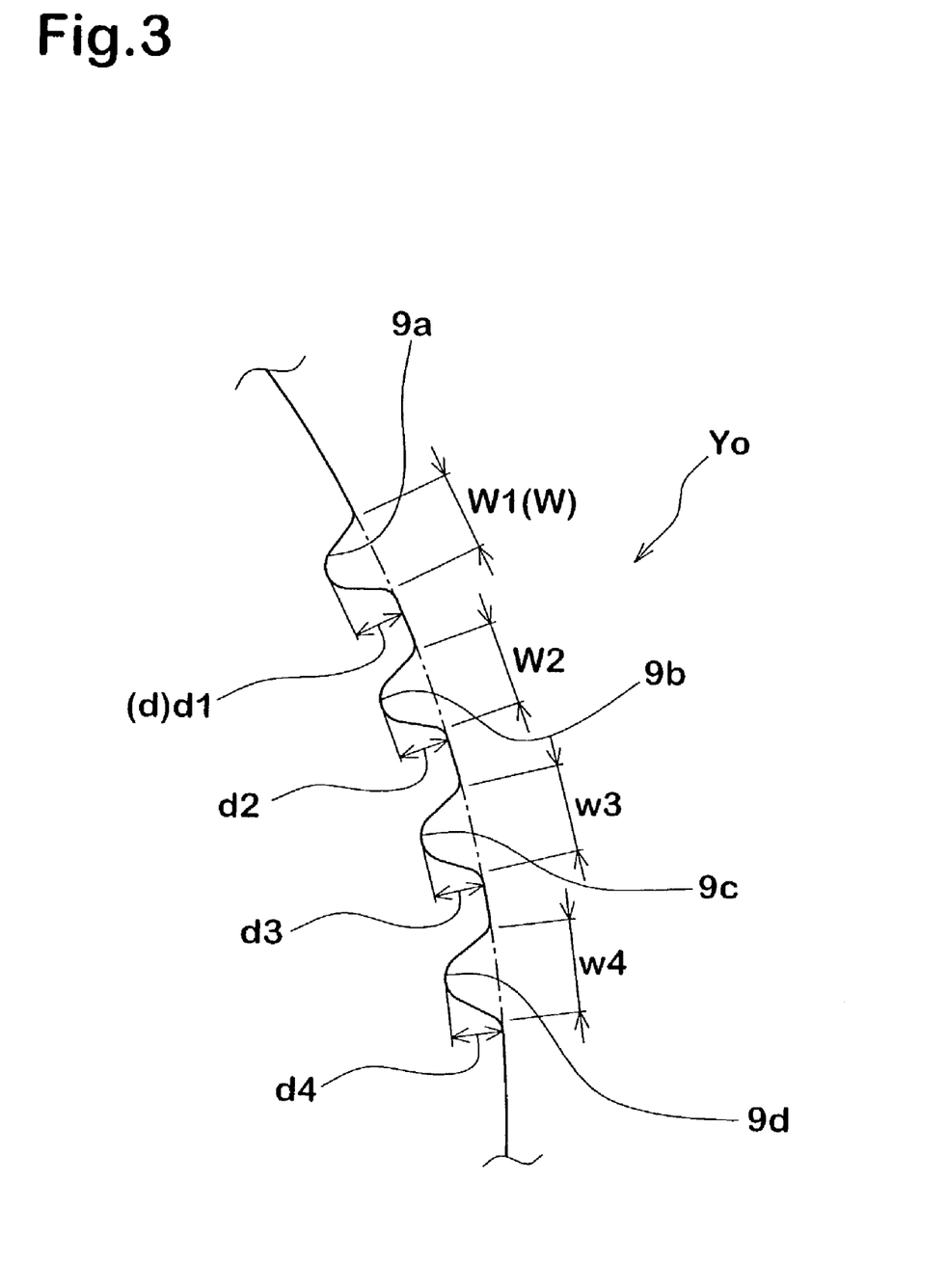
FIG. 3 is a sectional view illustrating a tire side region together with concave grooves in enlarged form.

As further illustrated in FIGS. 1 and 3, the pneumatic tire 1 is provided with at least one concave groove 9 extending substantially in the circumferential direction of the tire on an outer tire side region Yo formed between a grounding end Eo of the outer tread surface portion To and a maximum width position M of the tire facing outside of the vehicle. It should be noted that no concave grooves are formed on the inner tire side region Yi facing towards inside of the vehicle.

Such a concave groove 9 is capable of decreasing the spring coefficient of the outer tire side region Yo when compared to that of the inner tire side region Yi. It is accordingly possible to reduce some sense of roughness when performing turning movements that are apt to occur in such sort of tires of non-symmetric type through the bending of the outer tire side region Yo and thus improve riding comfort when performing turning movements. It is further possible to improve the durability since heat radiating effects of the outer tire side region Yo, which easily generate heat at the time of turning movements, are improved. It should be noted that such a concave groove 9 does not largely affect grounding shapes of the outer tread surface portion To.

It should further be noted that when the concave groove 9 is positioned further inside of the maximum width position M of the tire in the radial direction of the tire, the above-described spring coefficient reducing effects will become inferior while it may further happen that the durability is degraded owing to a tendency in that a rubber thickness of the bead portion becomes small.

Figure 4A:
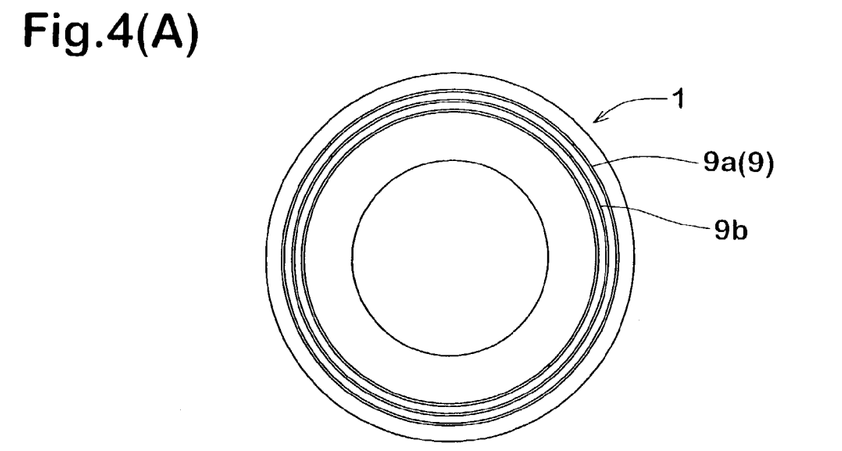
FIG. 4(A), FIG. 4(B) and FIG. 4(C) are side views of a tire illustrating forms of the concave grooves in schematic form.
Figure 4B:
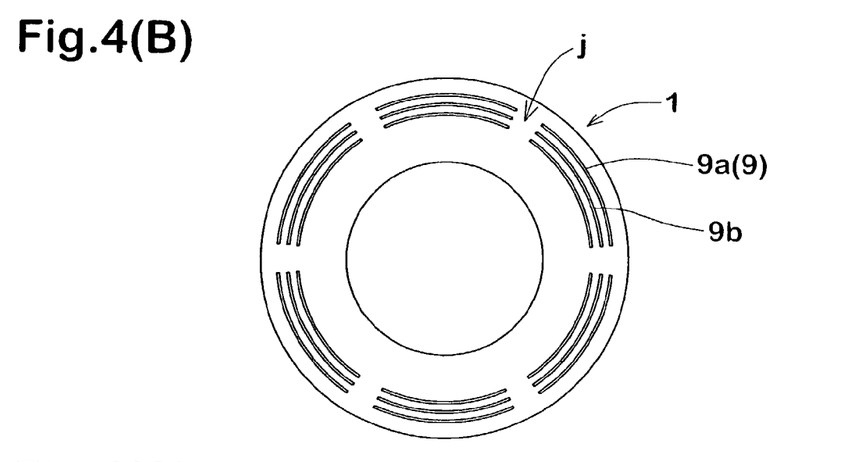
Figure 4C:
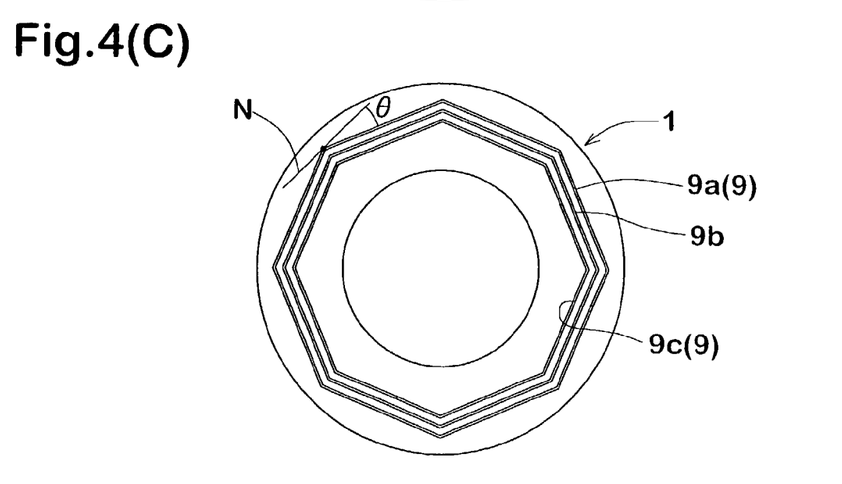

Note that the "concave groove 9 extending substantially in the circumferential direction of the tire" may be of a form as illustrated in FIG. 4(A) in which the grooves successively extends in an annular manner along the circumferential direction of the tire, and also includes a form as illustrated in FIG. 4(B) in which it includes interrupted portions j or a form as illustrated in FIG. 4(C) in which it is linear in which an angle θ with respect to a tangent N in the circumferential direction of the tire is less than 15°. It should be noted that it is desirable that the concave groove 9 occupies not less than 85% of the entire length of a line in the circumferential direction of the tire when interrupted portions j are included.

As illustrated in FIG. 3, the concave groove 9 of the present invention is comprised of at least three concave grooves disposed concentric with respect to each other, wherein the present embodiment illustrates an arrangement of four comprised of a first concave groove $9a$ located outermost in the radial direction of the tire and second to fourth concave grooves $9b$ to $9d$ that are sequentially disposed inward in this radial direction.

The groove width W of the respective concave grooves 9 is desirably 2.0 to 4.0 mm, and preferably 2.5 to 3.5 mm. With such concave grooves 9 of small width, it is possible to maintain stability of steering and turning properties upon closing groove walls when performing rapid turning movements. When the groove width is less than 2.0 mm, effects of improving riding comfort at the time of performing turning movements will become less, and a tendency is caused in that cracks are apt to be formed at groove bottoms and others. On the other hand, when the width exceeds 4.0 mm, it will become difficult to close the groove walls of the concave grooves when performing turning movements and the stability of steering will tend to become worse.

The groove width d of the concave grooves 9 is desirably set to 1.0 to 2.0 mm, and more preferably 1.0 to 1.5 mm. When the groove depth is less than 1.0 mm, effects of improving riding comfort at the time of turning will become less. On the other hand, when the depth exceeds 2.0 mm, the stability of steering will tend to become worse. It should be noted that when providing a plurality of concave grooves 9 as in the present embodiment, rigidity levels in which rigidities partially vary and chips in rubber are apt to be caused when the clearance between the concave grooves 9 is too small. Vice versa, if too broad, effects of reducing spring coefficients will be worsened. In view of the above, it is desirable to set the clearance between concave grooves 9 (which is defined to be a distance between adjoining groove edges) to 2.0 to 3.0 mm.

Upon performing various experiments, the inventors of the present invention have found that effects of the concave grooves 9 of reducing spring coefficients are substantially proportional to groove capacities thereof, and that rates of contribution became larger the further outward the concave groove 9 was located in the radial direction of the tire. However, it was also found that an increase in groove capacity of the outer concave grooves 9 in the radial direction of the tire also lead to degradations in stability of steering. The present embodiment accordingly has employed an arrangement in which the groove capacity is larger the further inward the concave groove 9 of the plurality of concave grooves 9 is located in the radial direction of the tire.

More particularly, the values are set to satisfy V1<V2<V3<V4 provided that the groove capacity of the first concave groove 9 is defined to be V1, the groove capacity of the second groove 9 V2, the groove capacity of the third groove 9 V3, and the groove capacity of the fifth groove 9 V4. With this arrangement, it is possible to effectively prevent degradations in stability of steering while reliably achieving a decrease in spring coefficient. It should be noted that variations in groove capacities of concave grooves 9 might be easily achieved by gradually increasing groove widths W1 to W4 of the first to fourth concave grooves $9a$ to $9d$, by gradually increasing groove depths d1 to d4 of the first to fourth concave grooves $9a$ to $9d$, or by combining these arrangements.

Upon performing various experiments, it has been further found that it is particularly preferable to form the concave grooves 9 in a region Z within the outer tire side region Yo that is located further inside of the outer grounding end Eo in the radial direction of the tire than a distance a that corresponds to 10% of a length Ha in the radial direction of the tire between the grounding end Eo and the maximum width position M of the tire, and further outside in the radial direction of the tire than a distance b that corresponds to 50% thereof. This region Z tends to be a bending center when performing turning movements. The riding comfort at the time of performing turning movements can accordingly be effectively improved by disposing the concave grooves 9 within this region Z. More preferably, ratio a/Ha is 10 to 20% and ratio b/Ha 30 to 40%.

Figure 5:
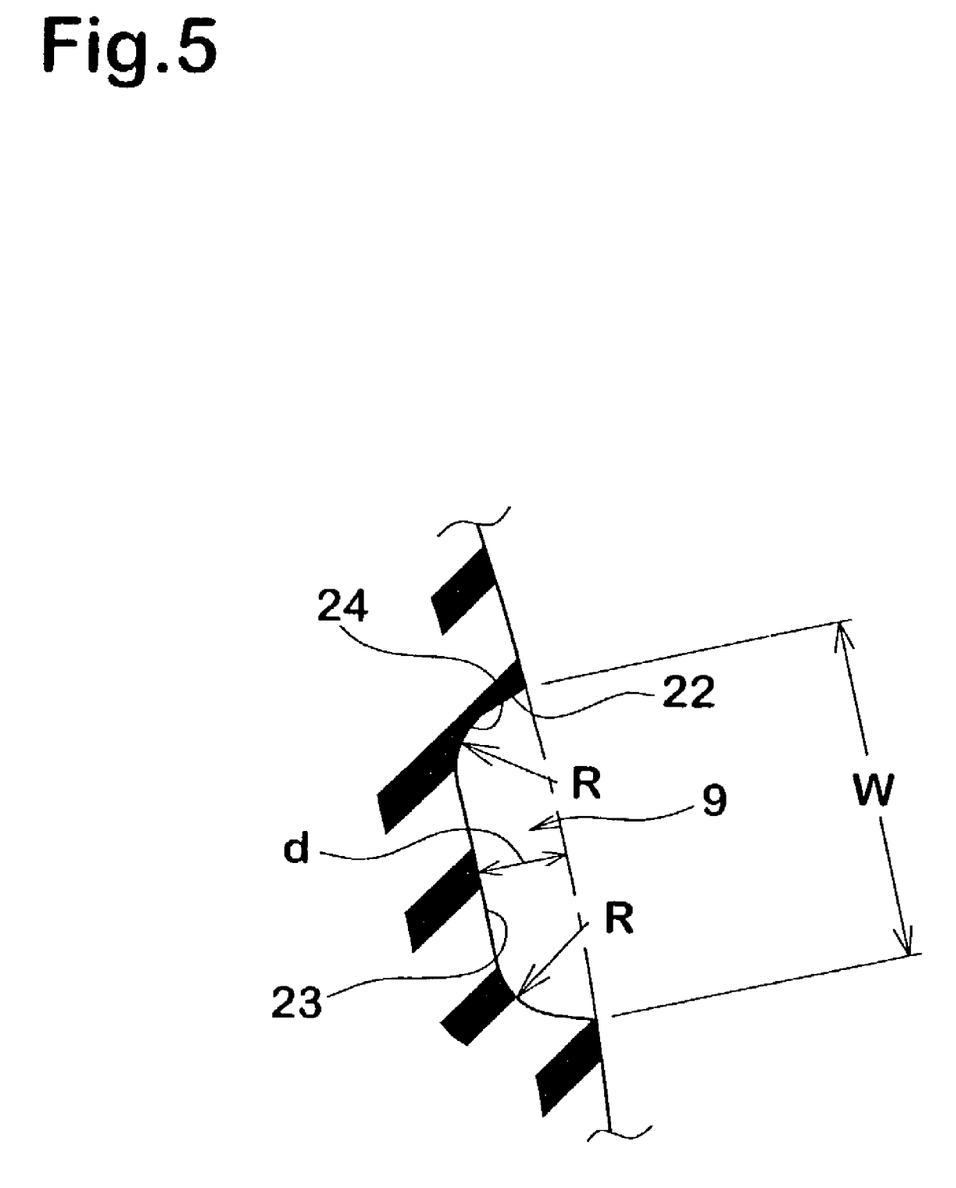
FIG. 5 is a sectional view illustrating another form of the concave groove.

While a case in which a plurality of concave grooves 9 are provided has been illustrated in the present embodiment, it is alternatively possible to form only one groove. In such a case, cracks are apt to occur at the groove bottom since a large amount of warps acts on the single concave groove 9 when compared to a case in which a plurality thereof is provided. For preventing such instances, it is preferable to connect a groove wall 22 and a groove wall 23 of the concave groove 9 by an arc 24 having a radius of curvature R of not less than 1 mm.

While the above descriptions are based on a particularly preferable form of embodiment of the present invention, the present invention is not to be limited to the above embodiment but may be embodied upon modulating the same into various forms.

EXAMPLE

Tires for use in a passenger vehicle of the arrangement as illustrated in FIG. 1 (tire size 205/65R15) have been manufactured on trial according to the specifications of Table 1 for performing tests with an actual vehicle on stability at the time of turning movements, turning properties and riding comfort at the time of turning movements. Specifications other than those of Table 1 are identical to all of the tires.
(1) Actual Vehicle Test The prototype tires were attached to all wheels of a vehicle (FF vehicle: 2300 cc) with a condition for the rim being (15×6JJ) and that for the internal pressure (215 kPa), wherein stability at the time of turning movements, turning properties and riding comfort at the time of turning movements were sensory-evaluated by a driver when running on a tire test course of dry asphalt. Evaluations were performed in four stages, namely very good (⊚), good (○), normal (Δ) and bad (X).

As explained so far, the present invention is arranged in that the rigidity of an outer tread surface portion is increased while the rigidity of an inner tread surface portion is reduced. With this arrangement, stability of steering and riding comfort at the time of straight-ahead running are balanced out. Since concave grooves extending in a substantially circumferential direction of the tire are provided in an outer tire side region, it is possible to suitable ease a spring constant of the outer tire side region through the concave grooves, and degradations in riding comfort such as roughness that occur during turning movements can be prevented.

When a difference between a land ratio (%) of the outer tread surface portion and a land ratio (%) of the inner tread surface portion is restricted to be in a constant region, it will be possible to balance out stability of steering and riding comfort at the time of straight-ahead running at higher orders. Particularly in case no circumferential grooves are provided in a tread shoulder region from among the outer tread surface portion, it will be possible to generate a larger cornering force while it will also be apt to receive larger inputs from the road surface. However, it will be possible to effectively restrict the inputs from being transmitted to the vehicle through the concave grooves.

Extreme reductions in spring coefficient may be prevented when not less than three concave grooves are provided and when groove widths and groove depths are specified to fall within a certain range. And when large side force occurred, if closed grooves walls of concave grooves, it is able to prevent to lose stability of steering.

When groove widths are increased the closer the concave groove is located inward in the radial direction of the tire from among the plurality of concave groove, the concave grooves that are closer to the tread surface, which are likely to affect stability of steering, will become narrower so as to reduce degradations in rigidity. Since the concave grooves on the bead portion side, which hardly affect stability of

TABLE 1

|  |  | Prior art | Example 1 | Example 2 | Example 3 | Example 4 | Example 5 | Example 6 |
|---|---|---|---|---|---|---|---|---|
| Number of concave grooves |  | 0 | 1 | 3 | 5 | 3 | 6 | 3 |
| Groove width × depth of concave groove [mm] |  | — | 3 × 1.5 | 3 × 1.0 | 3 × 1.0 | 3 × 2.0 | 3 × 1.0 | Outer portion 2 × 1.0 Mid portion 3 × 1.0 Inner portion 4 × 1.0 |
| Land ratio Lo of outer tread surface portion (%) |  | 80 | 80 | 80 | 72 | 72 | 65 | 72 |
| Land ratio Li of inner tread surface portion (%) |  | 55 | 55 | 55 | 55 | 55 | 50 | 55 |
| Test results | Stability at the time of turning movements | ⊚ | ⊚ | ⊚ | ○ | ○ | Δ | ○ |
|  | Turning properties | ○ | ○ | ○ | ○ | ○ | Δ | ⊚ |
|  | Riding comfort at the time of turning movements | X | Δ | Δ | ⊚ | ○ | ⊚ | ⊚ | steering, will become broader, it will be possible to secure reduction in spring coefficients in a balanced manner.

When a region for forming the concave grooves is limited within the outer tire side region, it will be possible to increase stability of steering in an effective manner while further improving riding comfort at the time of turning movements.

What is claimed is:

1. A pneumatic tire, having a tread surface that contains an inner tread surface portion that faces inward of the inner side of a vehicle from the tire equator and an outer tread surface portion that faces outward of the outer side of the vehicle from the tire equator, and having a non-symmetric pattern in which the land ratio of the tread pattern of the outer tread surface portion is larger than the land ratio of the tread pattern of the inner tread surface portion, wherein at least one concave groove extending substantially in the circumferential direction of the tire is formed on the outer tire side region formed between a grounding end of the outer tread surface portion and a maximum width position of the tire facing outward of the vehicle, and wherein no concave groove extending substantially in a circumferential direction of the tire is formed on an inner tire side region formed between a grounding end of the inner tread surface portion and a maximum width position of the tire facing inward of the vehicle.

2. The pneumatic tire according to claim 1, wherein the difference Lo−Li between the land ratio Lo (%) of the outer tread surface portion and the land ratio Li (%) of the inner tread surface portion is not less than 15%, and wherein no circumferential grooves successively extending in the circumferential direction of the tire are formed on a tread shoulder region of the outer tread surface portion, which is a region occupying 25% of a tread grounding width from the grounding end of the outer tread surface portion.

3. The pneumatic tire according to claim 1, wherein the concave grooves are at least three in number, arranged in a concentric manner, and wherein each of the concave grooves has a groove width of 2.0 to 4.0 mm and a groove depth of 1.0 to 2.0 mm.

4. The pneumatic tire according to claim 3, wherein the at least one concave groove is a plurality of concave grooves and that groove capacities of the plurality of concave grooves become larger the more a concave groove is positioned inside of the radial direction of the tire.

5. The pneumatic tire according to claim 1, wherein the concave groove is formed on the outer tire side region within a region that is located further inside from the grounding end in the radial direction of the tire at a distance of 10% of a length in the radial direction of the tire between the grounding end and the maximum width position of the tire to a position further outside in the radial direction of the tire at a distance of 50% of the length in the radial direction of the tire between the grounding end and the maximum width position of the tire.

* * * * *